Oct. 7, 1941.  A. W. DRAKE  2,258,549
ANIMAL TRAP
Filed Aug. 1, 1940  2 Sheets-Sheet 1
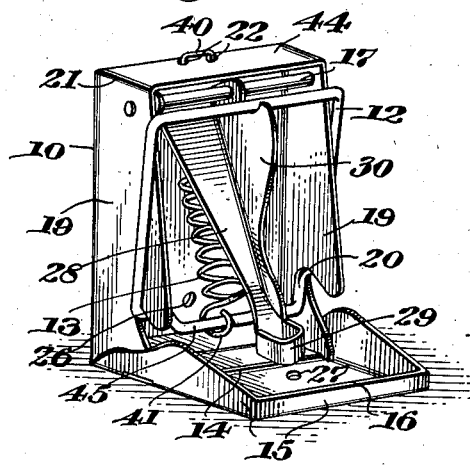
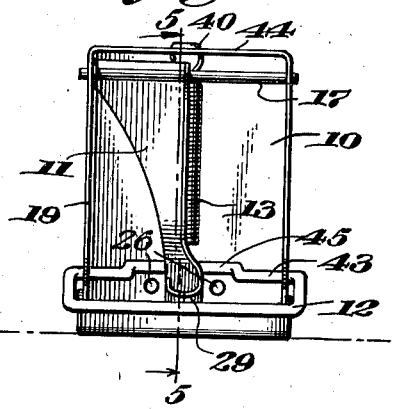
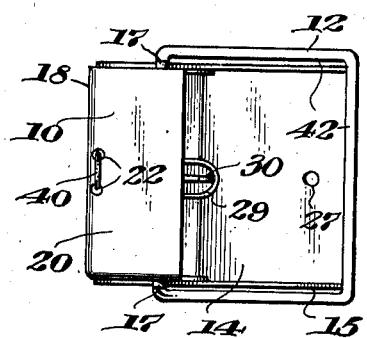
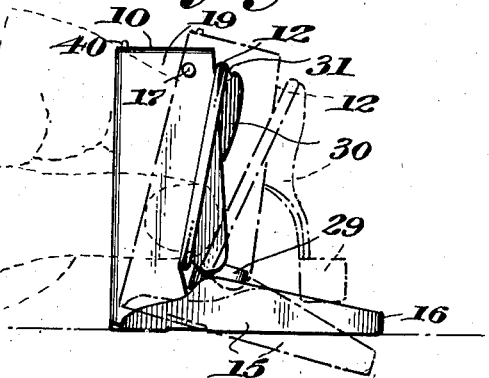
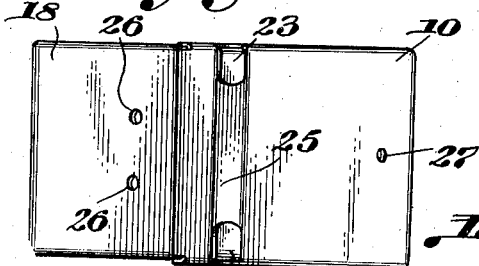
Inventor:
Augustus W. Drake
By A. D. Adams
Atty.

Oct. 7, 1941.   A. W. DRAKE   2,258,549
ANIMAL TRAP
Filed Aug. 1, 1940   2 Sheets-Sheet 2

Inventor:
Augustus W. Drake,
A.D.Adams
By   Atty.

Patented Oct. 7, 1941

2,258,549

UNITED STATES PATENT OFFICE 2,258,549

ANIMAL TRAP

Augustus W. Drake, Pasadena, Calif.

Application August 1, 1940, Serial No. 349,185

11 Claims. (Cl. 43—83)

The present invention relates to an animal trap of the type which is particularly adapted to catch mice and rats but which can be used for catching larger animals.

It is an object of the invention to not only make the manufacture of the trap as inexpensive as possible, but also to produce a trap with as few parts as possible. It is a further object of the invention to provide for an easy baiting and setting of the trap with no danger of catching the fingers during the setting thereof. It is a still further object of the invention to provide for automatic setting of the trap by holding the trap with the movable jaw under tension and then permitting the front end of the trap to dip downward to cooperate with the trigger arm.

A further object of the invention is to construct the trap of two stamped out blanks, of which one blank constitutes the frame casing and the other the trigger and bait holder; a heavy wire movable jaw; a spring and a bearing pin, all of which are cooperatively connected together to form the trap.

Further objects will be apparent from the following description, taken in connection with the accompanying drawings which illustrate a preferred embodiment and of which Fig. 1 is a perspective view of the trap;

Fig. 2 is a front elevation;

Fig. 3 is a plan view;

Fig. 4 is a side elevation;

Fig. 6 is a bottom plan view;

Figure 5:
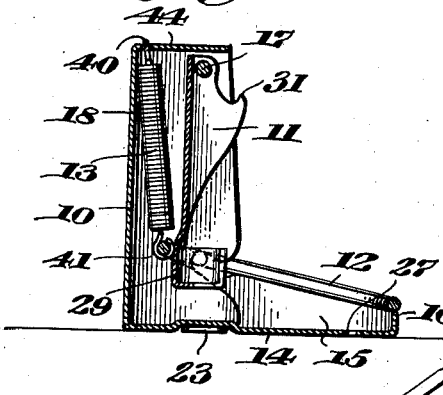
Fig. 5 is a vertical sectional view of the trap taken on line 5—5 of Fig. 2.

The trap is composed of five parts as follows: the frame portion 10, the trigger arm and bait holder 11, the movable jaw 12, the spring 13 and the bearing pin 17.

Figure 8:
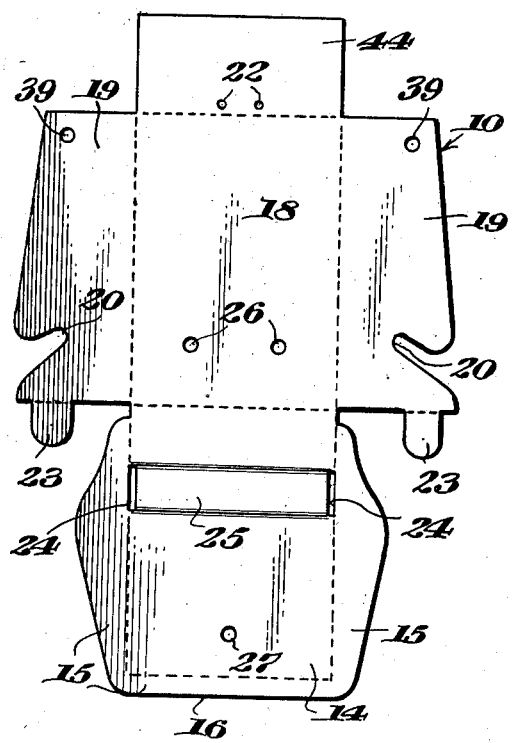
Fig. 8 is a plan view of the blank from which the frame portion of the trap is formed.

The frame portion or casing 10 is preferably stamped or cut out of sheet metal of which Fig. 8 illustrates the cut out blank, the dotted lines indicating fold lines on which the various parts are suitably bent. As shown in Figs. 1 and 5 the trap is supported on a base portion 14 which is approximately square and has three upstanding sides 15 constituting the stationary jaw 16. A back or upright portion 18 is provided with two opposite side walls 19 each of which has a notch 20 therein which act as bearings for and which retain the movable jaw 12 in position by the spring 13 rotatably limited in its movement by the stationary jaw 16 and the side walls 19. The back portion 18 is arranged at an approximate right angle to the base portion 14. The upper edge of the back portion 18 has a top member 44 with the side edges in contact with one edge of each side wall 19 at 21, Fig. 1. The top member 44 is provided with a pair of spaced perforations 22 into which one end 40 of the spring 13 is looped. The other edge of each side wall 19 is provided with a tongue 23 adapted to project through a slot 24 of which one is provided at each end of a section 25 in the base portion 14. The section 25 is depressed when the bottom or outer surface of the base portion 14 is considered and is raised when the inside surface is considered, Fig. 5. This section 25 is pressed into the base portion 14 so that the tongues 23, which securely hold the side walls down on the base portion 14, will permit the trap to maintain a firm position without rocking, due to the tongues 23 lying flat in the section 25, Fig. 5, and thus being flush with the bottom surface of the base 14. A pair of spaced perforations 26 in the back portion 18 will permit an easy application of a wire or cord (not shown) so that the trap may be tied to a leader so that it cannot be dragged away by a partially caught animal. Also, the base portion 14 is provided with a perforation 27 whereby the trap may be readily nailed to the floor and the like.

Figure 9:
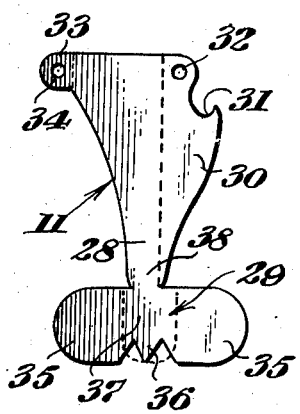
Fig. 9 is a plan view showing the blank from which the trigger arm and bait holder is formed.

The trigger arm and bait holder 11 is likewise preferably stamped from sheet metal as shown in Fig. 9, having an arm portion 28, a bait cup 29, a side wall 30 with a trigger notch or lip 31 and a perforation 32 near the upper edge thereof and a perforated lug 33 with a perforation 34 therein. The bait cup 29 is formed with two side lugs 35, a V-shaped end part and bottom section 36 and a main bottom portion 37 which completes the bait cup with the lower part 38 of the arm portion 28. With the lug 33 and the side wall 30 bent at right angles relative to the arm portion 28, the trigger arm and bait holder 11 is rotatably suspended in the side walls 19 by means of the pin 17, which latter passes through the perforations 32 and 34 and is secured in the perforations 39 in the side walls 19.

Figure 7:
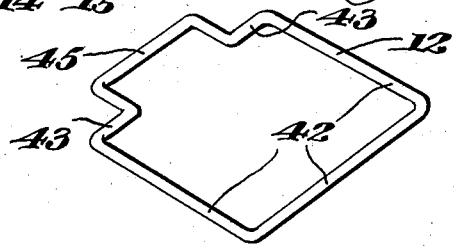
Fig. 7 is a perspective view of the movable jaw.

The other end 41 of the spring 13 is looped around the movable jaw 12, which latter is composed of a relatively heavy wire having a gripping section 42, Fig. 7, two bearing sections 43 which rotate in the notches 20 and a crank arm 45 to which the end 41 of the spring 13 is secured.

Fig. 1 shows the trap in set position and Figs.

2, 3 and 5 show the trap in the sprung position. Fig. 4 shows the safest and quickest way of setting the trap in which the movable jaw 12 is first brought into the raised position and is held as shown in full lines with the thumb and fingers firmly holding the sides 19 and spring 12 without permitting any relative movement between them. The trap is then tilted in the dotted line position at the same time easing up on the thumb and fingers so that the front end of the gripping section 42 will be caught and retained by the lip 31, the tilting having resulted in an outward swinging motion of the trigger and bait holder 11 relative to the frame portion 10. In the thus set position, since the lip 31 now holds the set jaw 12, the trap may be placed where desired without the possibility of the jaw being released to injure the hand or fingers, either during the setting step or the final placing step.

Obviously, the present invention is not restricted to the particular embodiment thereof herein shown and described.

I claim as my invention:

1. An animal trap comprising a frame casing having a base which also constitutes a stationary jaw and an upright portion with a pair of spaced side walls, each side wall having a bearing slot therein at the lower part thereof, a pin provided in the upper part of the side walls, a freely suspended trigger arm and bait holder mounted on the pin and provided with a side wall having a lip thereon, a movable jaw rotatably mounted in the bearing slots and adapted to cooperate with the lip in the set position of the trap and with the stationary jaw in the sprung position, and a spring connected at one end to the frame casing and at the other end to the movable jaw to constantly urge the jaws together relative to each other.

2. An animal trap according to claim 1, in which each side wall is provided with a tongue which grips the bottom side of the base.

3. An animal trap according to claim 1, in which the base is provided with a raised section and each side wall is provided with a tongue which grips the bottom side of the base in the raised section.

4. In the manufacture of animal traps, an integral frame casing blank comprising a back portion; a top member on the upper side of the back portion; a side wall on each side of the back portion having a tongue, a bearing slot and a perforation therein; a base portion on the bottom side of the back portion having slots therein for the tongues and a raised portion between and connecting the tongues; and side portions on the three remaining sides of the base portion to form the stationary jaw of the trap.

5. In the manufacture of animal traps, an integral trigger and bait holder comprising an arm portion; a side wall having a perforation therein and a trigger lip; a lug having a perforation therein; a pair of side lugs; and a V-shaped end part, the side lugs, V-shaped end part and a part of the arm portion constituting a bait cup.

6. In the manufacture of animal traps, an integral trigger and bait holder comprising an arm portion; a side wall on one side of the arm portion and having a perforation of which the latter is on one end of the arm portion; a lug on the other side of the arm portion and having a perforation therein at said end of the arm portion; and a pair of side lugs and a V-shaped end part on the other end of the arm portion, the side lugs, the V-shaped end part and a part of the arm portion constituting a bait cup.

7. An animal trap according to claim 1, in which the slots in the side walls of the upright portion are angularly arranged relative to the vertical whereby the spring by its constant tension will maintain the movable jaw at all times in bearing ends of the slots in any position of the jaw.

8. An animal trap according to claim 1, in which the stationary jaw is integral with the base and at right angles thereto in the form of three upstanding sides.

9. An animal trap according to claim 1, in which the frame casing is also composed of a top member interconnecting the side walls and the upright portion and to which the first-mentioned end of the spring is connected.

10. An animal trap according to claim 1, in which each slot in the side walls is open ended at one end and has a bearing at the other end, and the slots are angularly arranged relative to the vertical directed upwardly from the open ends whereby the spring by its constant tension will maintain the movable jaw at all times against the bearings in any position of the jaw.

11. An animal trap comprising a frame casing having a base which also constitutes a stationary jaw and an upright portion with a pair of spaced side walls, each side wall having a bearing slot therein at the lower part thereof, a trigger arm and bait holder provided with a side wall having a lip thereon, means for freely suspending the trigger arm and bait holder in the side walls, a movable jaw rotatably mounted in the bearing slots and adapted to cooperate with the lip in the set position of the trap and with the stationary jaw in the sprung position, and a spring connected at one end to the frame casing and at the other end to the movable jaw to constantly urge the jaws together relative to each other.

AUGUSTUS W. DRAKE.